United States Patent Office 3,181,610
Patented May 4, 1965

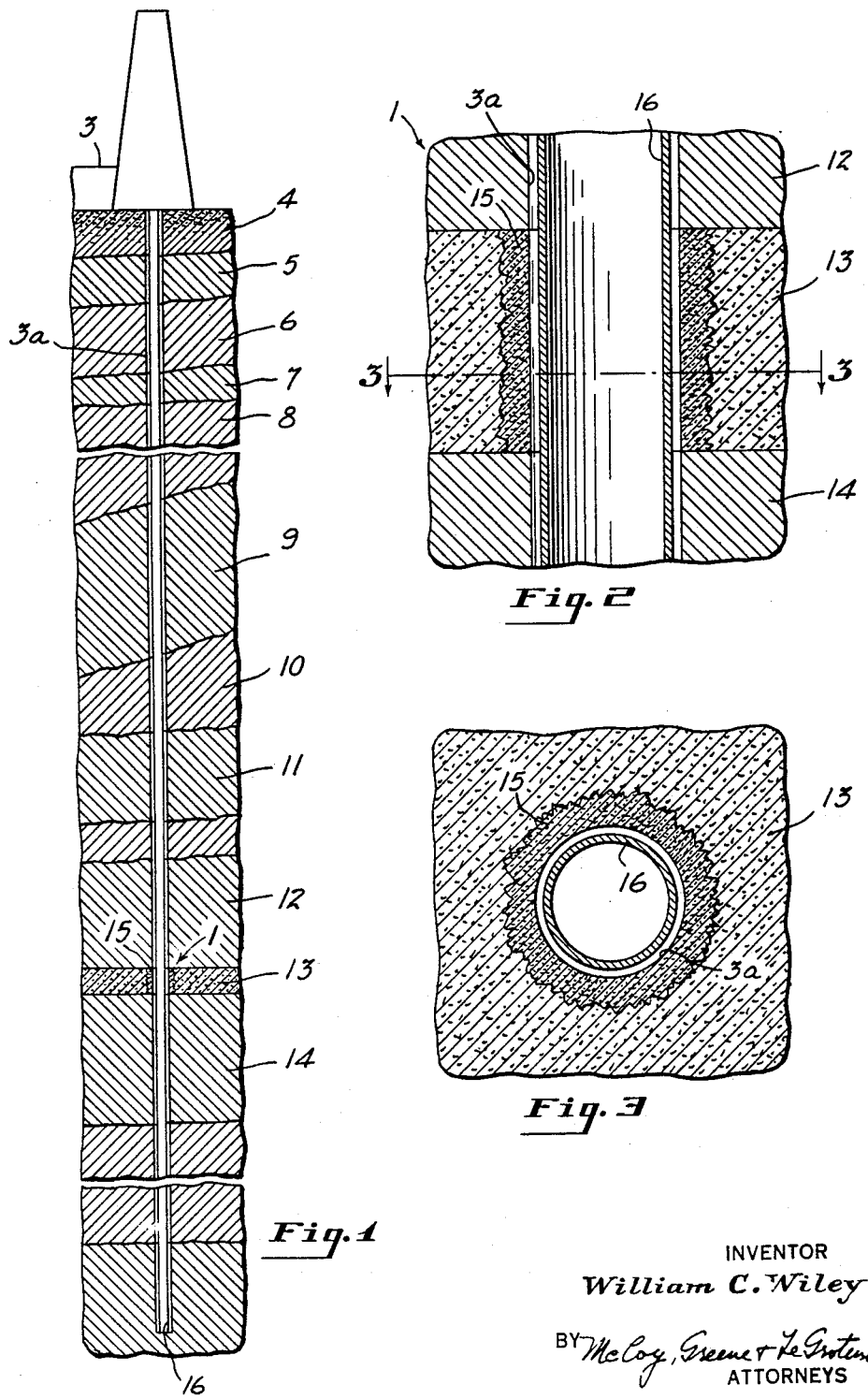

3,181,610
INORGANIC CEMENT CONTAINING A RETARD-
ING AMOUNT OF A MODIFIED ALDEHYDE
POLYMER
William C. Wiley, New Providence, N.J., assignor to The
General Tire & Rubber Company, Akron, Ohio, a corporation of Ohio
Filed Feb. 13, 1961, Ser. No. 88,773
10 Claims. (Cl. 166—31)

The present invention relates to cements. More specifically, this invention relates to oil well cement compositions, to methods of using said compositions particularly in cementing oil wells, and to oil wells containing said cements.

During the drilling of oil wells it is very desirable sometimes to seal off certain porous layers with cements to prevent the inflow of water from such layers which would tend to change the characteristics of the drilling mud or to prevent the loss of the mud itself or water from the mud. The cements, also, are useful in sealing off those layers which are porous and which may contain salt water, gas or even oil and which it is not desired to work because of other drilling operations or for reasons of economy. In order to obtain useful strengths so that they can withstand the pressures to which they are subjected, these cements should cure or set at relatively slow rates. These cements, also, should have low fluid loss properties so that all or a very substantial amount of the water necessary for proper hydration during curing or setting will be retained to obtain the desired strength. These problems become very serious in deep wells where the cement mixture or slurry of water and a Portland cement or Portland-type cement is pumped into the well and down the hole. In these wells high temperatures are frequently encountered at the places to be cemented and relatively long periods of time are required to pump the mixture into place. Moreover, the practice of pumping the mixture down the casing and forcing it upward around the outer surface of the casing or through perforations in the lower end of the casing requires the mixture to pass through narrow channels or openings. Thus, the mixture should remain pumpable at high temperatures for some time before hardening. However, after pumping into place, the hydration or setting of the cement should proceed at a rate sufficient to develop considerable strength in about 18-30 hours. Furthermore, since many porous formations have very small openings approaching capillary size, the cement mixture may rapidly lose its fluidity and form a coating or cake on the surface of the formation without sealing it completely under the pressures applied and in view of the temperature of the formation. Thus, it is highly desirable in oil well cementing to employ cement mixtures exhibiting low fluid loss and extended setting times.

Accordingly, it is a primary object of the present invention to provide a cementitious material characterized by an increase in its setting time or retardation and by its low fluid loss.

Another object of this invention is to provide a method for retarding the setting of cements and for reducing their fluid loss.

A further object is to provide a method for cementing wells such as oil wells with a retarded cement having improved fluid loss properties.

A still further object is to provide a well such as an oil well having a zone containing a retarded and low fluid loss cement.

These and other objects and advantages of the present invention will become more apparent to those skilled in the art from the following detailed description, examples and drawing in which FIGURE 1 is a schematic sectional view of an oil well,
FIGURE 2 is an enlarged vertical sectional view of the area represented by 1 in FIGURE 1, and
FIGURE 3 is a horizontal sectional view along the lines 3—3 of FIGURE 2.

According to the present invention it has been discovered that an increase in the retardation or setting time and a reduction in the fluid loss of inorganic cements can be achieved by adding to them a minor amount of a modified polymer selected from the group consisting of polymers of A and copolymers of about 70 to 99.9% by weight of A and the balance B and mixtures of the same, where A has the formula

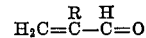

where R is selected from the group consisting of hydrogen, methyl and ethyl radicals and where B is at least one monomeric material copolymerizable with A, said polymer having been modified by reaction with a base having an ionization constant greater than that of ammonium hydroxide at 25° C. to convert from about 70 to 95% of the theoretical aldehyde groups of said polymer to alcoholic hydroxy and carboxylic salt groups and subsequently with an acid to convert said salt groups to carboxy groups.

The modified polymer can readily be mixed with an oil well cement and water and pumped from pump house 3 as shown in FIGURE 1 of the drawing down well 3a through various strata, 4 through 12, to porous layer 13 which is disposed between nonporous or relatively solid strata 12 and 14 and which it is desired to seal. The cement can be delivered or forced by conventional means into the adjacent areas of the porous formation or strata to form blocked or cemented area or zone 15 about the inner periphery of the wall of the well and surrounding casing or pipe 16 to effectively seal off the porous layer from the well as shown in FIGURES 2 and 3 of the drawing in greater detail. Where the porous layer is at the bottom of the well or where the driller runs into a porous layer, drilling can be stopped and the novel cement introduced or forced into the porous layer, allowed to set, and then drilling resumed through the area blocked off. Thus, the driller can drill through the blocked off area of the porous layer without fear of loss or dilution of the drilling mud. The compositions disclosed herein, also, can be used in whip stock drilling where a broken drill is cemented in place and drilling is continued around it.

The polymeric material used in the practice of the present invention is a modified polymer (A) of acrolein, methacrolein or ethacrolein or mixture thereof having the general formula

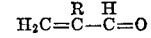

where R is a hydrogen, methyl or ethyl radical. Of these monomers it is preferred to use methacrolein or alpha methyl acrolein. Copolymers can also be employed in which (A) the acrolein monomer

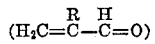

in an amount of from about 70 to 99.9% is copolymerized with (B) a copolymerizable monomer or monomers in total amount of from about 0.1 to 30% by weight. Examples of useful copolymerizable monomers (B) are one or more of the diolefinic compounds of less than 8 carbon atoms including the conjugated diolefines, butadiene-1,3-isoprene, chloroprene, cyanoprene, 2,3-dimethyl butadiene-1,3, and/or a copolymerizable mono-olefinic compound such as styrene, alpha methyl styrene, acrylonitrile, methacrylonitrile, methyl isopropenyl ketone, methyl vinyl ketone, vinyl toluene, and other available, olefinically-unsaturated, copolymerizable organic compounds and mixtures thereof. A polymer can be used herein which is formed by grafting the acrolein type monomer (A) to copolymers (B) of a conjugated diolefin having less than 8 carbon atoms such as butadiene and a copolymerizable monovinyl monomer such as styrene, as listed above. An example of a suitable polymer is a butadiene-methacrolein copolymer having methacrolein grafted thereto. These copolymers and graft polymers should contain from about 70 to 99.9% of the acrolein monomer(s). Mixtures of these polymers, copolymers and the like can be used as long as the mixture contains from about 70 to 99.9% of the acrolein type monomer (or its residue) so that the resulting material in the form of a latex will go into solution when treated with a strong base.

These polymers and copolymers which are to be modified and used according to the practice of the present invention can be formed by any recognized polymerization system such as by mass or bulk polymerization systems, pearl or suspension polymerization systems and emulsion polymerization systems. The suspension and emulsion polymerization systems are preferred because they are easier to work with, and, in addition, the emulsion system can lead to polymers with higher molecular weights than those formed by the mass or suspension systems. These polymers can, also, be made in organic solvent systems using ionic catalysts and can be converted into emulsions by treatment with soap and water followed by steam distillation to remove the organic solvent.

Substantial benefits are obtained in accordance with the present invention when the molecular weight of the polymer starting material is as low as 500, but for most purposes it is desirable that the average molecular weight be around 1,000 up to 25,000 or more.

In order to prepare the acrolein type polymer for subsequent use, an aqueous dispersion (including suspensions and emulsions) of the acrolein polymer, for example, is subjected to a base having a disassociation constant greater than about $1.8 \times 10^{-5}$, or a base having a disassociation constant greater than that of ammonium hydroxide at 25° C., to form a solution of the polymer in water. Preferred bases are water soluble hydroxides and basic salts of the alkali metals such as sodium, potassium and lithium. However, any other basic substance having a disassociation constant greater than that of ammonium hydroxide may be used. Strong organic bases such as diisobutyl amine, di-isopropyl amine and other secondary or tertiary alkyl amines, preferably having less than six aliphatic carbon atoms, and certain of the imines, such as piperidine, also bring about the desired reaction. The pH of the reaction mixture (base plus acrolein type polymer) should be above 8 and preferably around 11 or above.

The reaction with the strong base apparently reduces part (from about 35 to 47.5%) of the theoretical aldehyde groups of the acrolein type polymer or copolymer to alcoholic hydroxyl groups and oxidizes another equivalent part of carboxyl groups which in turn react with the base to form the corresponding carboxylic salt groups. Thus, from about 70 to 95% of the theoretical aldehyyde groups are converted to hydroxy and salt groups. One mole of base is theoretically added for each two moles of acrolein type monomer in the polymer. From 35 to 40 percent up to 50 to 60 percent of the theoretical amount of base is preferably added to the acrolein type polymer to convert from about 81 to 88 percent of the theoretical aldehyde groups, and when 100 percent of the theoretical amount of base is added, the actual conversion is found to be from about 90 to 95 percent of the theoretical aldehyde groups present. Generally, as low as .3 mole of base and as high as 1.5 moles can be used per mole of aldehyde groups present. The percent conversion depends upon the amount of base employed. For ultimate use, as an oil well cement additive according to the present invention, an acrolein type polymer is employed in which preferably from about 83 to 95% of the theoretical aldehyde groups have been converted to alcoholic hydroxy and carboxylic salt groups.

It is believed that the untreated polymer contains a predominant amount of acetal groups and some aldehyde groups. A representative formula is shown below (for polymethacrolein):

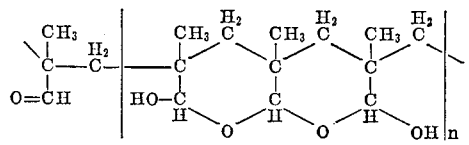

where $n$ is an integer. The polymer, thus, has a minor amount of aldehyde groups and a large amount of acetal groups or acetal-like linkages. Of course, when a diolefin such as butadiene-1,3 and/or a monoolefin like styrene is copolymerized with the methacrolein somewhat less acetal-like linkages will be formed. Now, when the polymethacrolein is reacted with the sodium hydroxide solution, the polymer will dissolve and from 70 to 95% of the theoretical aldehyde groups (acetal and aldehyde) will be converted to alcoholic hydroxyl and sodium carboxylic salt groups while the remaining groups will be aldehyde and any reacted acetal groups. For example, the NaOH treated polymer then has the following theoretical structure (where methacrolein was used initially):

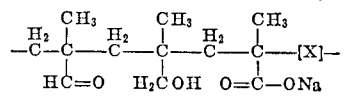

where X indicates a minor amount, if any, of unreacted acetal groups. Where a different base is used, such as lithium hydroxide or an amine, the salt radical will be different, i.e.,

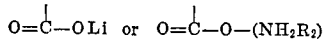

etc. where R is an alkyl group.

The aqueous solution of the polymer is then treated with an acid to convert the salt groups to carboxylic acid groups and to precipitate the polymer in the acid form. Any water soluble acid can be used which will react with the salt groups to replace the sodium or other cation with hydrogen. Examples of useful acids are hydrochloric acid, acetic acid, sulfuric acid, oxalic acid, nitric acid, boric acid, butyric acid, β-chloropropionic acid, isovaleric acid, propionic acid, pyrotartaric acid, formic acid, fumaric acid, malonic acid, succinic acid, iodic acid and the like and mixtures thereof. It, however, is preferred to use those acids having a degree of ionization for a normal solution at 18° C. of not over about 0.510 to avoid the formation of lactones or substantial amounts of lactones which may tend to reduce the retardation of the cement. For example, sulfuric and hydrochloric acids may give large amounts of lactone. Moreover, it is preferred to conduct the precipitation at low temperatures such as about 10 to 30° C. to prevent also the formation of lactones. Sufficient acid should be used to convert all or essentially all of the salt groups in the polymer to carboxylic acid groups. After the precipitation of the polymer containing the acid groups is complete, the precipitate is carefully filtered and washed to obtain a solid polymeric material. Filtering and washing should also be conducted at temperatures below about 30° C. to prevent or reduce the formation of lactones. The amount of lactone present in the polymer will vary with the strength of the acid used, the time and temperature of contact of the polymer with the acid, the degree of efficiency of the washing out of the acid from the polymer, and the drying time and temperature of the treated polymer. The resulting polymer will have the following general structure (where methacrolein was used initially):

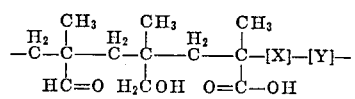

where X indicates a minor amount, if any, of acetal rings and Y indicates lactones, if any, formed during and subsequent to the treatment with acid and precipitation of the free acid containing polymer. Lactones present will have the general formula:

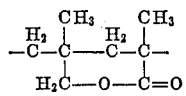

The aldehyde, alcohol and any acetal groups remain unreacted during treatment with the acid. The resulting polymer is then ready to be mixed with the cement to form a material exhibiting low fluid losses and good set retardation times.

While the free-acid polymer prepared as disclosed above, or by other methods, can be used with any cementitious material such as mortar mixtures, chalcedony cement, magnesium oxychloride cements and the like, the polymer is particularly useful with Portland cements, especially those of the oil well type which contain predominantly calcium silicates or hydraulic calcium silicates. These cements can be of the regular type or of the high sulfate resistant type. They can contain MgO in a maximum amount of about 5%, $SO_3$ in a maximum amount of about 3%, and $3CaO \cdot Al_2O_3$ in a maximum amount of about 15%; have a loss on ignition of up to about 3%; and have an insoluble residue of up to about 0.75%. In the high sulfate resistant oil well type of cement the maximum amount of tetra calcium alumina ferrite ($4CaO \cdot Al_2O_3 \cdot Fe_2O_3$) plus twice the tricalcium aluminate ($3CaO \cdot Al_2O_3$) should desirably be about 24%. Bentonite (principally montmorillonite), barite (principally crushed barium sulfate), and/or gypsum can be added to these cements if desired. Anti-foaming agents can also be used if necessary such as high molecular weight polyethylene and/or polypropylene oxides. Further information on the composition of these oil well cements can be found in the "API Specification For Oil-Well Cements and Cement Additives," API STD IOA, and issued by the American Petroleum Institute, Division of Production, Dallas 1, Texas. Mixtures of the cements can be used if desired.

The free-acid or modified polymeric material is used in a minor amount by weight based on the weight of the cement and sufficient to retard the setting or hardening of the cement and to prevent loss of fluid. Very minor amounts have been found useful. Large amounts are wasteful and may prove deleterious. In general, the free-acid polymer is used in an amount of from about 0.01 to 4% by weight of the cement (dry) although it is preferred to use the polymer in an amount of from about 0.1 to 2% by weight of the cement. It is not precisely known what occurs when the free acid type polymer is used with the cement, but it may be that some complex forms between the —OH radicals of the

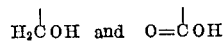

groups, or the —OH radicals of the

groups enhanced by the

groups, of the polymer and some fraction of the cement such as the calcium to reduce fluid loss and/or form a protective coating and retard the setting or hydration of the cement.

Sufficient water should be mixed with the cement to afford the desired degree of hydration, hardening or setting. The amounts to use will vary according to the type of cement, additives like bentonite, service conditions and so forth. In general, the amount of water can vary from about 30 to 70% by weight of the cement.

While the present invention is directed primarily to improvements in cements for oil wells, it is apparent that it will apply to other inorganic cements as well as to gas wells, water wells and so forth. While ordinary construction type cements would set up almost instantaneously at a depth of 12,000 to 14,000 feet due to heat and pressure, cements containing the free-acid acrolein type polymers disclosed herein exhibit extended retardation times and prevent premature hydration of the cement slurry. These cements show very satisfactory retardation times even at temperatures above 200° F. Moreover, the composition of the present invention can be used to line pipes, as a coating to seal walls, in the manufacture of concrete by mixing sand and gravel with the cement, water, polymer slurry to form a mixture useful in making sidewalks, curbs, gutters, streets, concrete blocks and so forth and in repairing bridges, dams, piling and so forth.

The following examples will serve to illustrate the invention with more particularity to those skilled in the art:

Example I

Three separate batches of polymethacrolein were prepared having different molecular weights by varying the amount of mixed tertiary mercaptans. The batches were polymerized in a reactor under nitrogen gas at a temperature of about 50° C. for about 12 hours to conversions of from 95 to 100%. The materials and amounts charged are set forth below:

| Material: | Parts by weight |
|---|---|
| Methacrolein (inhibitor free) | 100 |
| Water (deionized or distilled) | 300 |
| Emulsifier (sodium lauryl sulfate) | 4 |
| Potassium persulfate | 0.3 |
| Potassium phosphate ($K_3PO_4$-1.7% water) | 0.224 |
| Mixture of tertiary mercaptans | 0 to 6.0 |
| pH | 10.8 |

The resulting latices, about 25% solids, were separately reacted with aqueous NaOH solutions under nitrogen to convert approximately 90% of the theoretical aldehyde groups of the polymethacrolein to alcohol and sodium carboxylic salt groups and to form solutions of the polymers. The Brookfield viscosities at 25° C. on samples (dilute solutions-10% solids) from each batch of NaOH treated latex were measured. The sample from the first batch, designated A, had a viscosity of about 1600 centipoises (high molecular weight polymer). The sample from the second batch, designated B, had a viscosity of about 18 centipoises (low molecular weight polymer). The sample from the third batch, designated C, had a viscosity of about 13 centipoises (very low molecular weight polymer). After these viscosity determinations, each batch was separately treated in air at a temperature of about 25 to 72° C. with 7% aqueous acetic acid solutions in amounts sufficient to convert all or essentially all of the sodium salt groups of the polymers to free carboxylic acid groups. The resulting precipitates were then filtered, washed and dried to obtain fine powders. Each precipitate or free acid polymer was designated A, B or C according to the molecular weight determinations made above.

Example II

Samples of the free-acid polymers, A, B and C, as prepared by the method of Example I above, were tumble mixed with a Portland cement similar to a Class A oil well cement and then water was added and the mixture was tested according to American Petroleum Institute A.P.I. RP 10 B ("Recommended Practice for Testing Oil-Well Cements and Cement Additives," issued by the API Division of Production, 300 Corrigan Tower Bldg., Dallas 1, Texas). The results of the tests are shown below:

| Test No. | Polymer | Concentration of polymer as percent by weight of cement (dry) | Fluid loss, cc. of filtrate in 30 min. at 100 p.s.i. |
|---|---|---|---|
| 1 | None (control) | | 50 cc. in 20 seconds. |
| 2 | Polymer A | 1 | 6.5 cc. in 30 minutes. |
| 3 | Polymer B | 2 | 7.0 cc. in 30 minutes. |
| 4 | Polymer C | 2 | 7.5 cc. in 30 minutes. |
| 5 | CMHEC | 1 | 5.0 cc. in 30 minutes. |

These results show that the free acid polymeric material greatly improved the fluid loss of the cement and was comparable to the results obtained with CMHEC (carboxy methyl hydroxy ethyl cellulose).

*Example III*

Samples of the free acid polymers, A and C, as prepared by the method of Example I, above, as well as free acid polymer samples E and D prepared by similar methods, were mixed with oil well cements and water and tested according to A.P.I. RP 10 B as discussed above. The classes of cements used are disclosed in A.P.I. STD 10 A as shown above. Cement thickening retardation time was determined in a pressure-temperature thickening time tested according to the API Code test above. The results obtained are shown below:

| Test No. | Cement | Additive | Conc. of polymer in cement as percent by weight of cement (dry) | Time of retardation, minutes | Simulated test conditions |
|---|---|---|---|---|---|
| 11 | SC Class-D | CMHEC | 0.2 | 150 | 14,000 feet (206° F.), Schedule 19. |
| 12 | Starcor Class-D | Polymer A | 0.2 | 306 | Do. |
| 13 | do | Polymer C | 0.2 | 304 | 14,000 feet, Schedule 19. |
| 14 | do | do | 1.0 | 280 | 16,000 feet, Schedule 20. |
| 15 | Starcor Class-B | do | 0.2 | 257 | Do. |
| 16 | SRI Class-C | do | 0.2 | 180 | 10,000 feet, Schedule 17. |
| 17 | Starcor Class-D | Polymer D | 0.7 | 170 | 16,000 feet, Schedule 20. |
| 18 | do | do | 1.0 | 330 | Do. |
| 19 | Starcor Class-B | Polymer E | 0.2 | 242 | 14,000 feet (206° F.), Schedule 19. |
| 20 | Starcor Class-D | do | 0.2 | 290 | Do. |
| 21 | SRI Class-C | do | 0.2 | 198 | 10,000 feet, Schedule 17. |

Polymer D had a Brookfield viscosity of about 58–69 centipoises as determined on its sodium salt. Polymer E had a Brookfield viscosity of 30–31 centipoises as determined on its sodium salt. "SC" designates a commercial retarded, regular type oil well cement. The "SC" cement without the polymers of this invention at 16,000 feet cementing schedule had a retardation time of only about 93 minutes. "SRI" designates another commercial retarded cement which is sulfate resistant. The reference to "schedule" will be found in the above API test.

The data in Example III clearly show the improvements obtained using the free acid polymers of the present invention as set retarders for oil well cements. Moreover, cements containing the free acid polymers disclosed herein were from about 10 to over 100% better than cements containing carboxy methyl hydroxy ethyl cellulose.

In similar experiments using another commercial retarded oil well cement mixed with 40% water and varying amounts of a free acid polymer prepared by a method similar to that of Example I, above, and having a Brookfield viscosity of about 14 centipoises as determined on its sodium salt (10% solution in $H_2O$ at 75–76° F.), the following results were obtained:

| Amount of polymer | Cementing schedule | |
|---|---|---|
| | 16,000 feet retardation time | 18,000 feet retardation time |
| 0.2% | 3 hrs., 6 min | 2 hrs., 6 min. |
| 0.4% | 5 hrs., 46 min | 1 hr., 52 min. |
| 0.6% | 7 hrs., 12 min | 4 hrs., 58 min. |
| None (control) | 1 hr., 33 min | 1 hr., 33 min. |

It is to be understood that, in accordance with the provisions of the patent statutes, the various compositions, products and processes disclosed herein are presented for purposes of explanation and illustration and that various changes and modifications can be made in these compositions, products and processes without departing from the spirit of this invention.

What is claimed is:

1. A composition comprising an inorganic cementitious material selected from the group consisting of mortar mixtures, chalcedony cement, magnesium oxychloride cement and Portland cement and a minor amount sufficient to retard the setting of said cementitious material of a modified polymer selected from the group consisting of a homopolymer of a monomer defined by the Formula A, a copolymer of at least two different monomers defined by the Formula A, and a copolymer of from about 70 to 99.9% by weight of a monomer defined by the Formula A and the balance B and mixtures thereof, said homopolymer and copolymers having a molecular weight of at least 500, A having the formula

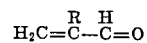

where R is selected from the group consisting of hydrogen, methyl and ethyl radicals and B being at least one olefinically unsaturated monomeric material other than A and copolymerizable with A, the modification of said polymer having been obtained by reaction of said polymer with a base having a disassociation constant greater than that of ammonium hydroxide at 25° C. to convert from about 70 to 95% of the theoretical aldehyde groups of said polymer to alcoholic hydroxy groups and carboxylic salt groups and subsequently with an acid to convert said salt groups to carboxy groups.

2. A composition comprising a Portland cement and from about 0.01 to 4% by weight of said cement of a modified polymer selected from the group consisting of a homopolymer of a monomer defined by the Formula A, a copolymer of at least two different monomers defined by the Formula A, and a copolymer of from about 70 to 99.9% by weight of a monomer defined by the Formula A and the balance B and mixtures thereof, said homopolymer and copolymers having a molecular weight of at least 500, A having the formula

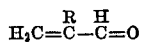

where R is selected from the group consisting of hydrogen, methyl and ethyl radicals and B being at least one olefinically unsaturated monomeric material other than A and copolymerizable with A, the modification of said polymer having been obtained by treatment of said polymer in latex form with a base having a disassociation constant greater than that of ammonium hydroxide at 25° C. to convert from about 70 to 95% of the theoretical aldehyde groups of said polymer to alcoholic hydroxy groups and carboxylic salt groups, and subsequently with an acid to convert said salt groups to carboxy groups, said acid having a degree of ionization at 18° C. for a normal solution of not above about 0.510.

3. An oil well cementitious composition comprising a Portland cement and from about 0.1 to 2% by weight of said cement of a modified polymer selected from the group consisting of a homopolymer of a monomer defined by the Formula A, a copolymer of at least two different monomers defined by the Formula A, and a copolymer of from about 70 to 99.9% by weight of a monomer defined by the Formula A and the balance B and mixtures thereof, said homopolymer and copolymers having a molecular weight of at least 500, A having the formula

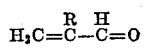

where R is selected from the group consisting of hydrogen, methyl and ethyl radicals and B being at least one olefinically unsaturated monomeric material other than A and copolymerizable with A, the modification of said polymer having been obtained by treatment of said polymer in latex form with a base having a disassociation constant greater than that of ammonium hydroxide at 25° C. to convert from about 70 to 95% of the theoretical aldehyde groups of said polymer to alcoholic hydroxy groups and carboxylic salt groups, and subsequently with an acid to convert said salt groups to carboxy groups, said acid having a degree of ionization at 18° C. for a normal solution of below about 0.510.

4. An oil well cementitious composition according to claim 3 where said A is methacrolein.

5. An oil well cementitious composition according to claim 4 where B is selected from the group consisting of butadiene-1,3, isoprene, chloroprene, cyanoprene, 2,3-dimethyl butadiene-1,3, styrene, acrylonitrile, methyl isopropenyl ketone, alpha methyl styrene, vinyl toluene, methacrylonitrile and methyl vinyl ketone.

6. The method which comprises delivering to a zone to be sealed of a well a composition comprising an inorganic cementitious material selected from the group consisting of mortar mixes, chalcedony cement, magnesium oxychloride cement and Portland cement and a minor amount sufficient to retard the setting of said cementitious material of a modified polymer and curing said composition in said zone, said polymer being selected from the group consisting of a homopolymer of a monomer defined by the Formula A, a copolymer of at least two different monomers defined by the Formula A, and a copolymer of from about 70 to 99.9% by weight of a monomer defined by the Formula A and the balance B and mixtures thereof, said homopolymer and copolymers having a molecular weight of at least 500, A having the formula

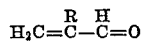

where R is selected from the group consisting of hydrogen, methyl and ethyl radicals and B being at least one olefinically unsaturated monomeric material other than A and copolymerizable with A, the modification of said polymer having been obtained by reaction of said polymer with a base having a disassociation constant greater than that of ammonium hydroxide at 25° C. to convert from about 70 to 95% of the theoretical aldehyde groups of said polymer to alcoholic hydroxy groups and carboxylic salt groups, and subsequently with an acid to convert said salt groups to carboxy groups.

7. The method which comprises delivering to a zone to be sealed off an oil well a composition comprising a Portland cement and from about 0.01 to 4% by weight of said cement of a modified polymer, and curing said composition in said zone, said polymer being selected from the group consisting of a homopolymer of a monomer defined by the Formula A, a copolymer of at least two different monomers defined by the Formula A, and a copolymer of from about 70 to 99.9% by weight of a monomer defined by the Formula A and the balance B and mixtures thereof, said homopolymer and copolymers having a molecular weight of at least 500, A having the formula

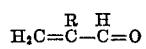

where R is selected from the group consisting of hydrogen, methyl and ethyl radicals and B being at least one olefinically unsaturated monomeric material other than A and copolymerizable with A, the modification of said polymer having been obtained by treatment of said polymer in latex form with a base having a disassociation constant greater than that of ammonium hydroxide at 25° C. to convert from about 70 to 95% of the theoretical aldehyde groups of said polymer to alcoholic hydroxy groups and carboxylic salt groups, and subsequently with an acid to convert said salt groups to carboxy groups, said acid having a degree of ionization at 18° C. for a normal solution of not above about 0.510.

8. The method which comprises pumping to a zone to be sealed of an oil well an oil well cementitious composition comprising a Portland cement, water in an amount sufficient to set said silicate cement, and from about 0.1 to 2% by weight of said cement of a modified polymer, and permitting said cement to set in said zone, said polymer being selected from the group consisting of a homopolymer of a monomer defined by the Formula A, a copolymer of at least two different monomers defined by the Formula A, and a copolymer of from about 70 to 99.9% by weight of a monomer defined by the Formula A and the balance B and mixtures thereof, said homopolymer and copolymers having a molecular weight of at least 500, A having the formula

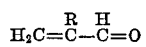

where R is selected from the group consisting of hydrogen, methyl and ethyl radicals and B being at least one olefinically unsaturated monomeric material other than A and copolymerizable with A, the modification of said polymer having been obtained by treatment of said polymer in latex form with a base having a disassociation constant greater than that of ammonium hydroxide at 25° C. to convert from about 70 to 95% of the theoretical aldehyde groups of said polymer to alcoholic hydroxy groups and carboxylic salt groups, and subsequently with an acid to convert said salt groups to carboxy groups, said acid having a degree of ionization at 18° C. for a normal solution of below about 0.510.

9. The method according to claim 8 where said A is methacrolein.

10. The method according to claim 9 where B is selected from the group consisting of butadiene-1,3, isoprene, chloroprene, cyanoprene, 2,3-dimethylbutadiene-1,3, styrene, acrylonitrile, methyl isopropenyl ketone, alpha methyl styrene, vinyl toluene, methacrylonitrile, and methyl vinyl ketone.

(References on following page)

References Cited by the Examiner

UNITED STATES PATENTS

| | | | |
|---|---|---|---|
| 326,439 | 9/85 | McEachen | 166—21 |
| 2,554,973 | 5/51 | Ballard et al. | 260—67 |
| 2,614,998 | 10/52 | Lea | 260—29.6 |
| 2,819,239 | 1/58 | Eberhard et al. | 166—33 |
| 2,924,589 | 2/60 | Jurgeleit | 260—67 |
| 2,999,830 | 9/61 | Gruber et al. | 260—29.6 |

WILLIAM H. SHORT, *Primary Examiner.*

BENJAMIN BENDETT, *Examiner.*